United States Patent
Adams, Jr.

(10) Patent No.: US 8,494,301 B2
(45) Date of Patent: Jul. 23, 2013

(54) REFOCUSING IMAGES USING SCENE CAPTURED IMAGES

(75) Inventor: James E. Adams, Jr., Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 392 days.

(21) Appl. No.: 12/883,261

(22) Filed: Sep. 16, 2010

(65) Prior Publication Data

US 2012/0070097 A1     Mar. 22, 2012

(51) Int. Cl.
*G06K 9/40*     (2006.01)

(52) U.S. Cl.
USPC ......................................................... 382/255

(58) Field of Classification Search
USPC ............... 348/208.12, 345, 346, 678, E9.021,
348/E3.048, E5.045; 352/140, 4.04, 609,
352/624; 356/3, 4.03, 4.04, 11, 224, 609,
356/624; 359/319, 698; 375/E7.011, E7.182;
382/106, 255; 396/76, 79, 80, 82, 102, 103,
396/121, 138; 715/767, 802
See application file for complete search history.

(56) References Cited

U.S. PATENT DOCUMENTS

| | | |
|---|---|---|
| 3,971,065 A | 7/1976 | Bayer |
| 4,642,678 A | 2/1987 | Cok |
| 4,774,574 A | 9/1988 | Daly et al. |
| 5,189,511 A | 2/1993 | Parulski et al. |
| 5,282,045 A | 1/1994 | Mimura et al. |
| 5,493,335 A | 2/1996 | Parulski et al. |
| 5,652,621 A | 7/1997 | Adams |
| 5,668,597 A | 9/1997 | Parulski et al. |
| 6,192,162 B1 | 2/2001 | Hamilton, Jr. et al. |
| 6,292,218 B1 | 9/2001 | Parulski et al. |
| 6,934,056 B2 | 8/2005 | Gindelle |
| 7,542,077 B2 | 6/2009 | Miki |
| 2003/0080974 A1* | 5/2003 | Grosvenor et al. ........... 345/622 |
| 2004/0080661 A1 | 4/2004 | Afseniu et al. |
| 2005/0191729 A1 | 9/2005 | Kaczmarek et al. |
| 2007/0024931 A1 | 2/2007 | Compton |
| 2007/0035712 A1 | 2/2007 | Gassner et al. |
| 2008/0219654 A1* | 9/2008 | Border et al. .................... 396/89 |
| 2008/0247602 A1* | 10/2008 | Fields et al. .................. 382/106 |
| 2009/0121027 A1 | 5/2009 | Nadabar |
| 2011/0110560 A1* | 5/2011 | Adhikari ...................... 382/103 |

FOREIGN PATENT DOCUMENTS

| | | |
|---|---|---|
| KR | 716179 B1 * | 5/2007 |
| WO | 2010/124070 | 10/2010 |

OTHER PUBLICATIONS

Mrityunjay Kumar, Optimal image fusion using the Rayleigh quotient, IEEE Sensors Applications Symposium, Feb. 2009.

* cited by examiner

*Primary Examiner* — Gregory F Cunningham

(74) *Attorney, Agent, or Firm* — Raymond L. Owens

(57) ABSTRACT

A method of providing a refocused image, includes using a processor to perform the steps of acquiring at least two captured images of a scene with differing focus settings, using the at least two captured images to provide an all-in-focus image, generating a range map from the at least two captured images, locating a region-of-interest (ROI) window from the range map, and providing a refocused image from the all-in-focus image and the region-of-interest (ROI) window.

14 Claims, 10 Drawing Sheets

REFOCUSING IMAGES USING SCENE CAPTURED IMAGES

FIELD OF THE INVENTION

The present invention relates to forming a refocused image from at least two scene captured images with different focus settings.

BACKGROUND OF THE INVENTION

A desirable photographic effect is "bokeh", the strong blurring of objects that are not the main subject of the picture. This is an aesthetic quality of blur that is not easily achieved with digital cameras that use low-cost lenses. The general solution in the low-cost digital camera arena is to capture two or more images with different focus setting of the lens and to digitally merge, or "fuse", the images to produce a bokeh effect. There are many descriptions of systems that capture multiple images with different focus settings (a "through-focus" series) and then merging them to produce desired images. In U.S. Patent Application Publication 2007/0035712 Gassner, et al., teach capturing a through-focus series of images, computing image contrast for each image, and then composing a composite image from the regions of the through-focus images with highest contrast. In U.S. Patent Application Publication 2009/0121027 Nadabar describes another way of combining the best portions of each image in a through-focus series into a desired composite image. Finally, Mrityunjay Kumar, in "Optimal image fusion using the Rayleigh quotient," IEEE Sensors Applications Symposium, February 2009, describes fusing images from a through-focus series in such a way as to maximize the energy of the resulting image. The difficulty with all these approaches is that the segmentation of the subject of interest from the rest of the objects in the scene based on image contrast and other energy-based arguments will only find the objects that are the most in-focus in the through-focus series. The important additional cue of subject distance is not directly used. Additionally, with the previous methods only one composite image is generated from the through-focus series where, in fact, it is possible to generate several different images, each with different main subjects with their own bokeh effects from the same through-focus series. In this last regard, what is missing is a way to automatically produce one or more refocused images with a given main subject in-focus and the rest of the scene aesthetically out-of-focus from a through-focus series of captures.

SUMMARY OF THE INVENTION

The present invention represents a method of providing a refocused image, comprising using a processor to perform the steps of (a) acquiring at least two captured images of a scene with differing focus settings;

(b) using the at least two captured images to provide an all-in-focus image;

(c) generating a range map from the at least two captured images;

(d) locating a region-of-interest (ROI) window from the range map; and (e) providing a refocused image from the all-in-focus image and the region-of-interest (ROI) window.

This invention has the advantage that the ROI window is automatically located based on object distances in the scene without the user needing to identify the objects of interest manually.

It has the additional advantage of being able to automatically produce as many differently refocused images as there are captured images with different focus settings minus one, each with a different range of objects in focus and all after the set of captured images has been acquired.

This and other aspects, objects, features, and advantages of the present invention will be more clearly understood and appreciated from a review of the following detailed description of the preferred embodiments and appended claims, and by reference to the accompanying drawings.

Figure 1:
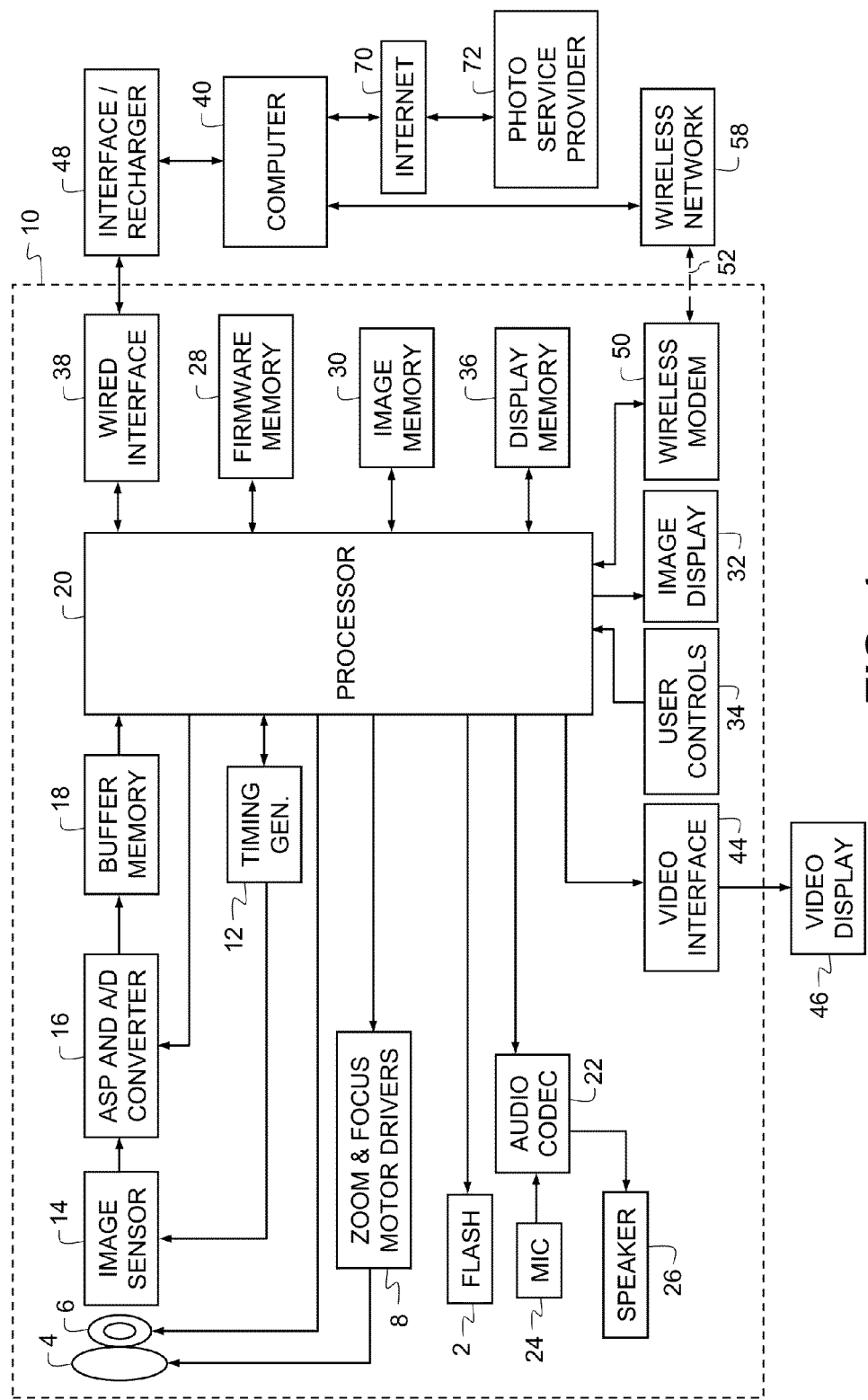
FIG. 1 is a high-level diagram showing the components of a digital camera system.

It is to be understood that the attached drawings are for purposes of illustrating the concepts of the invention and may not be to scale.

DETAILED DESCRIPTION OF THE INVENTION

In the following description, a preferred embodiment of the present invention will be described in terms that would ordinarily be implemented as a software program. Those skilled in the art will readily recognize that the equivalent of such software can also be constructed in hardware. Because image manipulation algorithms and systems are well known, the present description will be directed in particular to algorithms and systems forming part of, or cooperating more directly with, the system and method in accordance with the present invention. Other aspects of such algorithms and systems, and hardware or software for producing and otherwise processing the image signals involved therewith, not specifically shown or described herein, can be selected from such systems, algorithms, components and elements known in the art. Given the system as described according to the invention in the following materials, software not specifically shown, suggested or described herein that is useful for implementation of the invention is conventional and within the ordinary skill in such arts.

Still further, as used herein, a computer program for performing the method of the present invention can be stored in a computer readable storage medium, which can include, for example; magnetic storage media such as a magnetic disk (such as a hard drive or a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program having instructions for controlling one or more computers to practice the method according to the present invention.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. It should be noted that, unless otherwise explicitly noted or required by context, the word "or" is used in this disclosure in a non-exclusive sense.

Because digital cameras employing imaging devices and related circuitry for signal capture and processing, and display are well known, the present description will be directed in particular to elements forming part of, or cooperating more directly with, the method and apparatus in accordance with the present invention. Elements not specifically shown or described herein are selected from those known in the art. Certain aspects of the embodiments to be described are provided in software. Given the system as shown and described according to the invention in the following materials, software not specifically shown, described or suggested herein that is useful for implementation of the invention is conventional and within the ordinary skill in such arts.

The following description of a digital camera will be familiar to one skilled in the art. It will be obvious that there are many variations of this embodiment that are possible and are selected to reduce the cost, add features or improve the performance of the camera.

FIG. 1 depicts a block diagram of a digital photography system, including a digital camera 10 in accordance with the present invention. Preferably, the digital camera 10 is a portable battery operated device, small enough to be easily handheld by a user when capturing and reviewing images. The digital camera 10 produces digital images that are stored as digital image files using image memory 30. The phrase "digital image" or "digital image file", as used herein, refers to any digital image file, such as a digital still image or a digital video file.

In some embodiments, the digital camera 10 captures both motion video images and still images. The digital camera 10 can also include other functions, including, but not limited to, the functions of a digital music player (e.g. an MP3 player), a mobile telephone, a GPS receiver, or a programmable digital assistant (PDA).

The digital camera 10 includes a lens 4 having an adjustable aperture and adjustable shutter 6. In a preferred embodiment, the lens 4 is a zoom lens and is controlled by zoom and focus motor drives 8. The lens 4 focuses light from a scene (not shown) onto an image sensor 14, for example, a single-chip color CCD or CMOS image sensor. The lens 4 is one type optical system for forming an image of the scene on the image sensor 14. In other embodiments, the optical system can use a fixed focal length lens with either variable or fixed focus.

The output of the image sensor 14 is converted to digital form by Analog Signal Processor (ASP) and Analog-to-Digital (A/D) converter 16, and temporarily stored in buffer memory 18. The image data stored in buffer memory 18 is subsequently manipulated by a processor 20, using embedded software programs (e.g. firmware) stored in firmware memory 28. In some embodiments, the software program is permanently stored in firmware memory 28 using a read only memory (ROM). In other embodiments, the firmware memory 28 can be modified by using, for example, Flash EPROM memory. In such embodiments, an external device can update the software programs stored in firmware memory 28 using a wired interface 38 or a wireless modem 50. In such embodiments, the firmware memory 28 can also be used to store image sensor calibration data, user setting selections and other data which must be preserved when the camera is turned off. In some embodiments, the processor 20 includes a program memory (not shown), and the software programs stored in the firmware memory 28 are copied into the program memory before being executed by the processor 20.

It will be understood that the functions of processor 20 can be provided using a single programmable processor or by using multiple programmable processors, including one or more digital signal processor (DSP) devices. Alternatively, the processor 20 can be provided by custom circuitry (e.g., by one or more custom integrated circuits (ICs) designed specifically for use in digital cameras), or by a combination of programmable processor(s) and custom circuits. It will be understood that connectors between the processor 20 from some or all of the various components shown in FIG. 1 can be made using a common data bus. For example, in some embodiments the connection between the processor 20, the buffer memory 18, the image memory 30, and the firmware memory 28 can be made using a common data bus.

The processed images are then stored using the image memory 30. It is understood that the image memory 30 can be any form of memory known to those skilled in the art including, but not limited to, a removable Flash memory card, internal Flash memory chips, magnetic memory, or optical memory. In some embodiments, the image memory 30 can include both internal Flash memory chips and a standard interface to a removable Flash memory card, such as a Secure Digital (SD) card. Alternatively, a different memory card format can be used, such as a micro SD card, Compact Flash (CF) card, MultiMedia Card (MMC), xD card or Memory Stick.

The image sensor 14 is controlled by a timing generator 12, which produces various clocking signals to select rows and pixels and synchronizes the operation of an ASP and A/D converter 16. The image sensor 14 can have, for example, 12.4 megapixels (4088×3040 pixels) in order to provide a still image file of approximately 4000×3000 pixels. To provide a color image, the image sensor is generally overlaid with a color filter array, which provides an image sensor having an array of pixels that include different colored pixels. The different color pixels can be arranged in many different patterns. As one example, the different color pixels can be arranged using the well-known Bayer color filter array, as described in commonly assigned U.S. Pat. No. 3,971,065 to Bayer, the disclosure of which is incorporated herein by reference. As a second example, the different color pixels can be arranged as described in commonly assigned U.S. Patent Application Publication 2005/191729 to Compton and Hamilton, the disclosure of which is incorporated herein by reference. These examples are not limiting, and many other color patterns can be used.

It will be understood that the image sensor 14, timing generator 12, and ASP and A/D converter 16 can be separately fabricated integrated circuits, or they can be fabricated as a single integrated circuit as is commonly done with CMOS image sensors. In some embodiments, this single integrated circuit can perform some of the other functions shown in FIG. 1, including some of the functions provided by processor 20.

The image sensor 14 is effective when actuated in a first mode by timing generator 12 for providing a motion sequence of lower resolution sensor image data, which is used when capturing video images and also when previewing a still image to be captured, in order to compose the image. This preview mode sensor image data can be provided as HD resolution image data, for example, with 1280×720 pixels, or as VGA resolution image data, for example, with 640×480 pixels, or using other resolutions which have significantly columns and rows of data, compared to the resolution of the image sensor.

The preview mode sensor image data can be provided by combining values of adjacent pixels having the same color, or by eliminating some of the pixels values, or by combining some color pixels values while eliminating other color pixel values. The preview mode image data can be processed as described in commonly assigned U.S. Pat. No. 6,292,218 to Parulski, et al which is incorporated herein by reference.

The image sensor 14 is also effective when actuated in a second mode by timing generator 12 for providing high resolution still image data. This final mode sensor image data is provided as high resolution output image data, which for scenes having a high illumination level includes all of the pixels of the image sensor, and can be, for example, a 12 megapixel final image data having 4000×3000 pixels. At lower illumination levels, the final sensor image data can be provided by "binning" some number of like-colored pixels on the image sensor, in order to increase the signal level and thus the "ISO speed" of the sensor. The zoom and focus motor drivers 8 are controlled by control signals supplied by the processor 20, to provide the appropriate focal length setting and to focus the scene onto the image sensor 14. The exposure level of the image sensor 14 is controlled by controlling the f/number and exposure time of the adjustable aperture and adjustable shutter 6, the exposure period of the image sensor 14 via the timing generator 12, and the gain (i.e., ISO speed) setting of the ASP and A/D converter 16. The processor 20 also controls a flash 2 which can illuminate the scene.

The lens 4 of the digital camera 10 can be focused in the first mode by using "through-the-lens" autofocus, as described in commonly-assigned U.S. Pat. No. 5,668,597 to Parulski et al., which is incorporated herein by reference. This is accomplished by using the zoom and focus motor drivers 8 to adjust the focus position of the lens 4 to a number of positions ranging between a near focus position to an infinity focus position, while the processor 20 determines the closest focus position which provides a peak sharpness value for a central portion of the image captured by the image sensor 14. The focus distance which corresponds to the closest focus position can then be utilized for several purposes, such as automatically setting an appropriate scene mode, and can be stored as metadata in the image file, along with other lens and camera settings.

The processor 20 produces menus and low resolution color images that are temporarily stored in a display memory 36 and are displayed on an image display 32. The image display 32 is typically an active matrix color liquid crystal display (LCD), although other types of displays, such as organic light emitting diode (OLED) displays, can be used. A video interface 44 provides a video output signal from the digital camera 10 to a video display 46, such as a flat panel HDTV display. In preview mode, or video mode, the digital image data from buffer memory 18 is manipulated by processor 20 to form a series of motion preview images that are displayed, typically as color images, on the image display 32. In review mode, the images displayed on the image display 32 are produced using the image data from the digital image files stored in image memory 30.

The graphical user interface displayed on the image display 32 is controlled in response to user input provided by user controls 34. The user controls 34 are used to select various camera modes, such as video capture mode, still capture mode, and review mode, and to initiate capture of still images, recording of motion images. The user controls 34 are also used to set user processing preferences, and to choose between various photography modes based on scene type and taking conditions. In some embodiments, various camera settings can be set automatically in response to analysis of preview image data, audio signals, or external signals such as GPS, weather broadcasts, or other available signals.

In some embodiments, when the digital camera 10 is in a still photography mode the above-described preview mode is initiated when the user partially depresses a shutter button, which is one of the user controls 34, and the still image capture mode is initiated when the user fully depresses the shutter button. The user controls 34 are also used to turn on the digital camera 10, control the lens 4, and initiate the picture taking process. User controls 34 typically include some combination of buttons, rocker switches, joysticks, or rotary dials. In some embodiments, some of the user controls 34 are provided by using a touch screen overlay on the image display 32. In other embodiments, the user controls 34 can include a way to receive input from the user or an external device via a tethered, wireless, voice activated, visual or other interface. In other embodiments, additional status displays or images displays can be used.

The camera modes that can be selected using the user controls 34 include a "timer" mode. When the "timer" mode is selected, a short delay (e.g., 10 seconds) occurs after the user fully presses the shutter button, before the processor 20 initiates the capture of a still image.

An audio codec 22 connected to the processor 20 receives an audio signal from a microphone 24 and provides an audio signal to a speaker 26. These components can be used to record and playback an audio track, along with a video sequence or still image. If the digital camera 10 is a multi-function device such as a combination camera and mobile phone, the microphone 24 and the speaker 26 can be used for telephone conversation.

In some embodiments, the speaker 26 can be used as part of the user interface, for example to provide various audible signals which indicate that a user control has been depressed, or that a particular mode has been selected. In some embodiments, the microphone 24, the audio codec 22, and the processor 20 can be used to provide voice recognition, so that the user can provide a user input to the processor 20 by using voice commands, rather than user controls 34. The speaker 26 can also be used to inform the user of an incoming phone call. This can be done using a standard ring tone stored in firmware memory 28, or by using a custom ring-tone downloaded from a wireless network 58 and stored in the image memory 30. In addition, a vibration device (not shown) can be used to provide a silent (e.g., non audible) notification of an incoming phone call.

The processor 20 also provides additional processing of the image data from the image sensor 14, in order to produce rendered sRGB image data which is compressed and stored within a "finished" image file, such as a well-known Exif-JPEG image file, in the image memory 30.

The digital camera 10 can be connected via the wired interface 38 to an interface/recharger 48, which is connected to a computer 40, which can be a desktop computer or portable computer located in a home or office. The wired interface 38 can conform to, for example, the well-known USB 2.0 interface specification. The interface/recharger 48 can provide power via the wired interface 38 to a set of rechargeable batteries (not shown) in the digital camera 10.

The digital camera 10 can include the wireless modem 50, which interfaces over a radio frequency band 52 with the wireless network 58. The wireless modem 50 can use various wireless interface protocols, such as the well-known Bluetooth wireless interface or the well-known 802.11 wireless interface. The computer 40 can upload images via the Internet 70 to a photo service provider 72, such as the Kodak Easy-Share Gallery. Other devices (not shown) can access the images stored by the photo service provider 72.

In alternative embodiments, the wireless modem 50 communicates over a radio frequency (e.g. wireless) link with a mobile phone network (not shown), such as a 3GSM network, which connects with the Internet 70 in order to upload digital image files from the digital camera 10. These digital image files can be provided to the computer 40 or the photo service provider 72.

Figure 2:
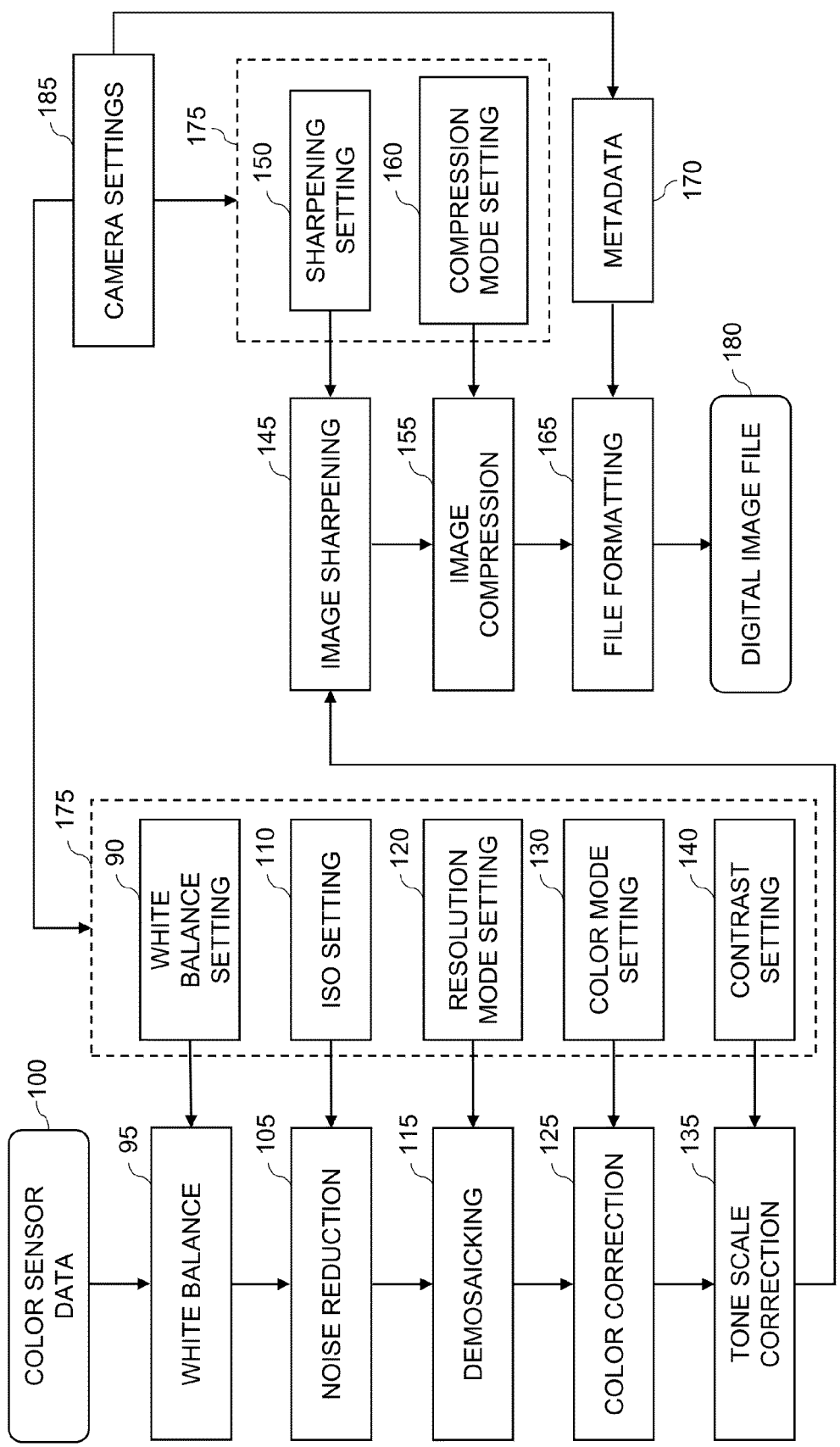
FIG. 2 is a flow diagram depicting typical image processing operations used to process digital images in a digital camera.

FIG. 2 is a flow diagram depicting image processing operations that can be performed by the processor 20 in the digital camera 10 (FIG. 1) in order to process color sensor data 100 from the image sensor 14 output by the ASP and A/D converter 16. In some embodiments, the processing parameters used by the processor 20 to manipulate the color sensor data 100 for a particular digital image are determined by various photography mode settings 175, which are typically associated with photography modes that can be selected via the user controls 34, which enable the user to adjust various camera settings 185 in response to menus displayed on the image display 32.

The color sensor data 100 which has been digitally converted by the ASP and A/D converter 16 is manipulated by a white balance step 95. In some embodiments, this processing can be performed using the methods described in commonly-assigned U.S. Pat. No. 7,542,077 to Miki, the disclosure of which is herein incorporated by reference. The white balance can be adjusted in response to a white balance setting 90, which can be manually set by a user, or which can be automatically set by the digital camera 10.

The color image data is then manipulated by a noise reduction step 105 in order to reduce noise from the image sensor 14. In some embodiments, this processing can be performed using the methods described in commonly-assigned U.S. Pat. No. 6,934,056 to Gindele et al, the disclosure of which is herein incorporated by reference. The level of noise reduction can be adjusted in response to an ISO setting 110, so that more filtering is performed at higher ISO exposure index setting.

The color image data is then manipulated by a demosaicking step 115, in order to provide red, green and blue (RGB) image data values at each pixel location. Algorithms for performing the demosaicking step 115 are commonly known as color filter array (CFA) interpolation algorithms or "deBayering" algorithms. In one embodiment of the present invention, the demosaicking step 115 can use the luminance CFA interpolation method described in commonly-assigned U.S. Pat. No. 5,652,621 to Adams et al., the disclosure of which is incorporated herein by reference. The demosaicking step 115 can also use the chrominance CFA interpolation method described in commonly-assigned U.S. Pat. No. 4,642,678 to Cok, the disclosure of which is herein incorporated by reference.

In some embodiments, the user can select between different pixel resolution modes, so that the digital camera can produce a smaller size image file. Multiple pixel resolutions can be provided as described in commonly-assigned U.S. Pat. No. 5,493,335 to Parulski et al., the disclosure of which is herein incorporated by reference. In some embodiments, a resolution mode setting 120 can be selected by the user to be full size (e.g. 3,000×2,000 pixels), medium size (e.g. 1,500× 1000 pixels) or small size (750×500 pixels).

The color image data is color corrected in color correction step 125. In some embodiments, the color correction is provided using a 3×3 linear space color correction matrix, as described in commonly-assigned U.S. Pat. No. 5,189,511 to Parulski, et al., the disclosure of which is incorporated herein by reference. In some embodiments, different user-selectable color modes can be provided by storing different color matrix coefficients in firmware memory 28 of the digital camera 10. For example, four different color modes can be provided, so that the color mode setting 130 is used to select one of the following color correction matrices:

Setting 1 (normal color reproduction)

$$\begin{bmatrix} R_{out} \\ G_{out} \\ B_{out} \end{bmatrix} = \begin{bmatrix} 1.50 & -0.30 & -0.20 \\ -0.40 & 1.80 & -0.40 \\ -0.20 & -0.20 & 1.40 \end{bmatrix} \begin{bmatrix} R_{in} \\ G_{in} \\ B_{in} \end{bmatrix} \quad (1)$$

Setting 2 (saturated color reproduction)

$$\begin{bmatrix} R_{out} \\ G_{out} \\ B_{out} \end{bmatrix} = \begin{bmatrix} 2.00 & -0.60 & -0.40 \\ -0.80 & 2.60 & -0.80 \\ -0.40 & -0.40 & 1.80 \end{bmatrix} \begin{bmatrix} R_{in} \\ G_{in} \\ B_{in} \end{bmatrix} \quad (2)$$

Setting 3 (de-saturated color reproduction)

$$\begin{bmatrix} R_{out} \\ G_{out} \\ B_{out} \end{bmatrix} = \begin{bmatrix} 1.25 & -0.15 & -0.10 \\ -0.20 & 1.40 & -0.20 \\ -0.10 & -0.10 & 1.20 \end{bmatrix} \begin{bmatrix} R_{in} \\ G_{in} \\ B_{in} \end{bmatrix} \quad (3)$$

Setting 4 (monochrome)

$$\begin{bmatrix} R_{out} \\ G_{out} \\ B_{out} \end{bmatrix} = \begin{bmatrix} 0.30 & 0.60 & 0.10 \\ 0.30 & 0.60 & 0.10 \\ 0.30 & 0.60 & 0.10 \end{bmatrix} \begin{bmatrix} R_{in} \\ G_{in} \\ B_{in} \end{bmatrix} \quad (4)$$

In other embodiments, a three-dimensional lookup table can be used to perform the color correction step 125.

The color image data is also manipulated by a tone scale correction step 135. In some embodiments, the tone scale correction step 135 can be performed using a one-dimensional look-up table as described in U.S. Pat. No. 5,189,511, cited earlier. In some embodiments, a plurality of tone scale correction look-up tables is stored in the firmware memory 28 in the digital camera 10. These can include look-up tables which provide a "normal" tone scale correction curve, a "high contrast" tone scale correction curve, and a "low contrast" tone scale correction curve. A user selected contrast setting 140 is used by the processor 20 to determine which of the tone scale correction look-up tables to use when performing the tone scale correction step 135.

The color image data is also manipulated by an image sharpening step 145. In some embodiments, this can be provided using the methods described in commonly-assigned U.S. Pat. No. 6,192,162 to Hamilton, et al., the disclosure of which is incorporated herein by reference. In some embodiments, the user can select between various sharpening settings, including a "normal sharpness" setting, a "high sharpness" setting, and a "low sharpness" setting. In this example, the processor 20 uses one of three different edge boost multiplier values, for example 2.0 for "high sharpness", 1.0 for "normal sharpness", and 0.5 for "low sharpness" levels, responsive to a sharpening setting 150 selected by the user of the digital camera 10.

The color image data is also manipulated by an image compression step 155. In some embodiments, the image compression step 155 can be provided using the methods described in commonly-assigned U.S. Pat. No. 4,774,574 to Daly et al., the disclosure of which is incorporated herein by reference. In some embodiments, the user can select between various compression settings. This can be implemented by storing a plurality of quantization tables, for example, three different tables, in the firmware memory 28 of the digital camera 10. These tables provide different quality levels and average file sizes for the compressed digital image file 180 to be stored in the image memory 30 of the digital camera 10. A user selected compression mode setting 160 is used by the processor 20 to select the particular quantization table to be used for the image compression step 155 for a particular image.

The compressed color image data is stored in the digital image file 180 using a file formatting step 165. The digital image file 180 can include various metadata 170. Metadata 170 is any type of information that relates to the digital image, such as the model of the camera that captured the image, the size of the image, the date and time the image was captured, and various camera settings, such as the lens focal length, the exposure time and f-number of the lens, and whether or not the camera flash fired. In a preferred embodiment, all of this metadata 170 is stored using standardized tags within the well-known Exif-JPEG still image file format. In a preferred embodiment of the present invention, the metadata 170 includes information about various camera settings 185, including the photography mode settings 175.

Figure 3:
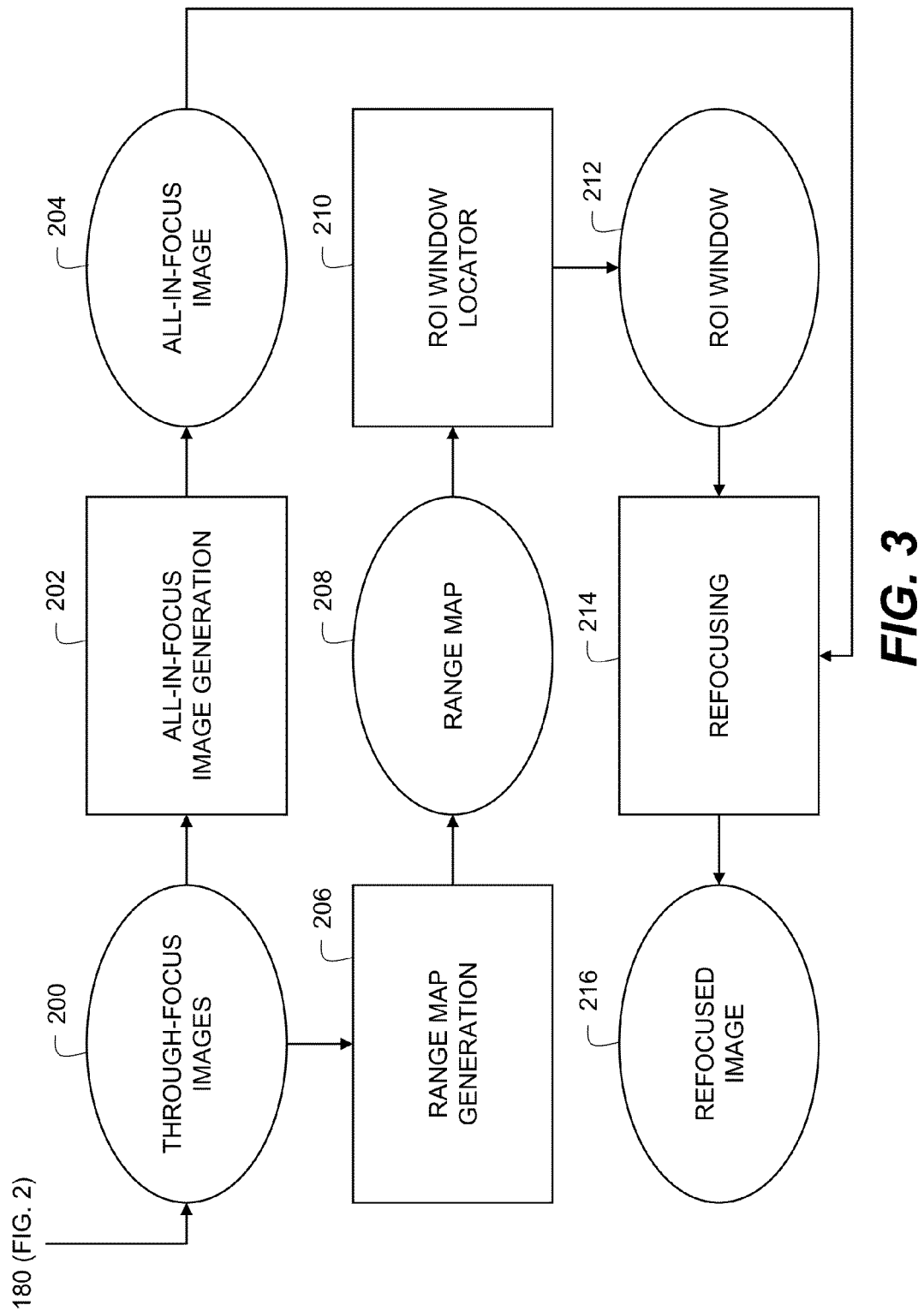
FIG. 3 is a block diagram of the preferred embodiment of the present invention.

The present invention will now be described with reference to FIG. 3. FIG. 3 is a flowchart of a top view of the preferred embodiment. At least two through-focus images 200 are produced from the digital camera 10 (FIG. 1), each image as a digital image file 180 (FIG. 2). Each image in the through-focus images 200 is captured with a different focus setting of the lens 4 (FIG. 1) of the digital camera 10 (FIG. 1). As a result of using different focus settings, each image in the through-focus images 200 will have different in-focus objects in the image from the other images in the through-focus images 200. An all-in-focus image 204 is generated by an all-in-focus image generation block 202 from the through-focus images 200. In the all-in-focus image 204 all the objects in the image are nominally in-focus. A range map 208 is generated by a range map generation block 206 from the through-focus images 200. A region-of-interest (ROI) window 212 is located by a ROI window locator block 210 from the range map 208. A refocused image 216 is provided by a refocusing block 214 from the ROI window 212 and the all-in-focus image 204.

Figure 4:
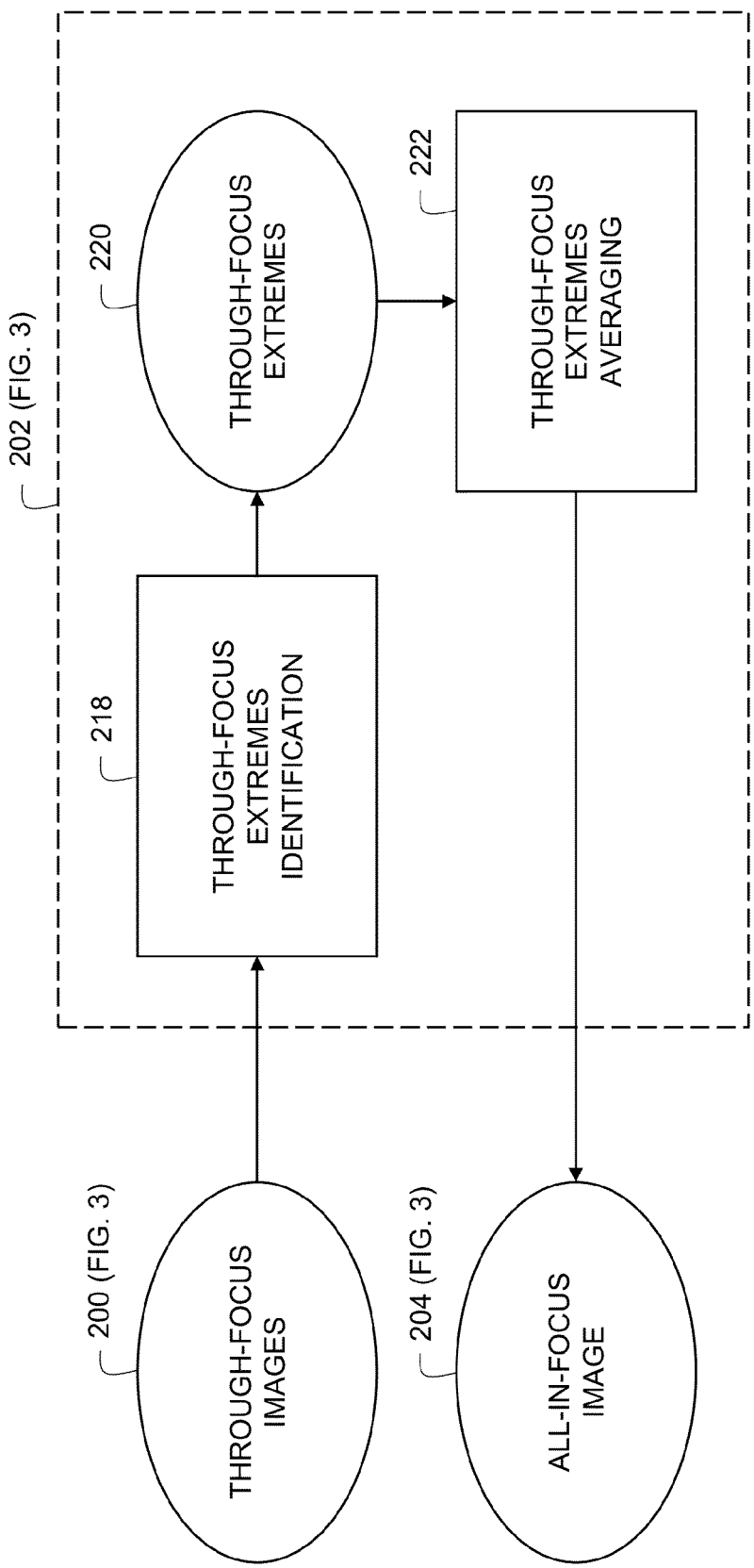
FIG. 4 is a block diagram showing a detailed view of the all-in-focus image generation block for a preferred embodiment of the present invention.

FIG. 4 is a detailed description of the all-in-focus image generation block 202 (FIG. 3) for the preferred embodiment. Through-focus extremes 220 are identified by a through-focus extremes identification block 218 from the through-focus images 200 (FIG. 3). The all-in-focus image 204 (FIG. 3) is generated by a through-focus extremes average block 222 from the through-focus extremes 220.

Figure 10:
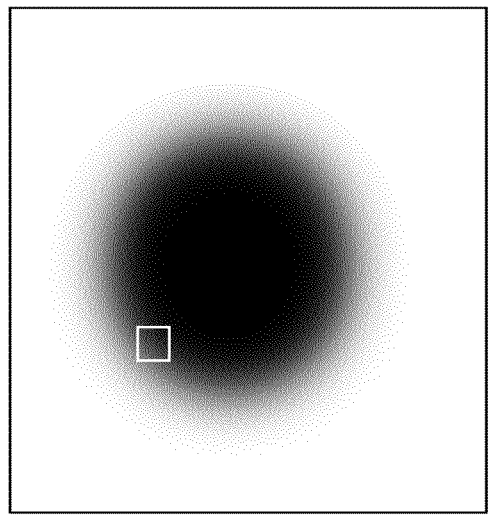
FIGS. 10A-10C are examples of through-focus images.
Figure 10:
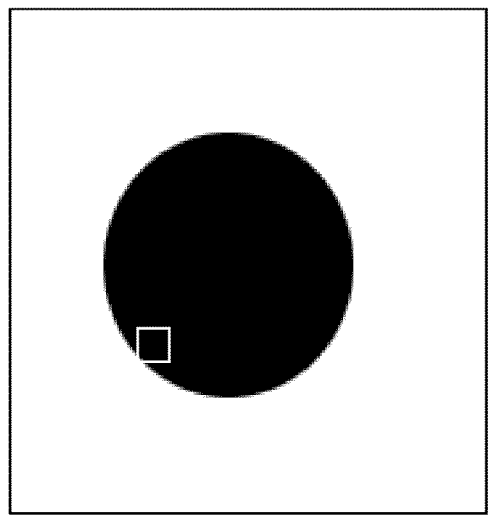
Figure 10:
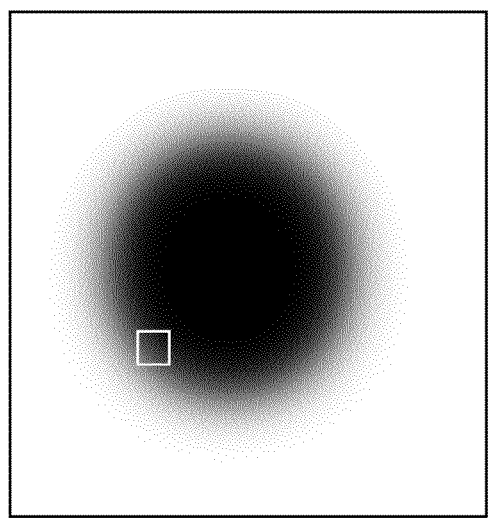

In FIG. 4 the through-focus extremes identification block 218 searches for the minimum and maximum pixels values for each pixel location in the through-focus images 200 (FIG. 3). FIGS. 10A-10C illustrate a through-focus series of images with FIG. 10B in-focus and FIGS. 10A and 10C out of focus. A pixel location is highlighted as a small square with a white border in each image. The minimum (darkest) code value occurs in FIG. 10B, while the maximum (brightest) code values occur equally in FIG. 10A and FIG. 10C. The through-focus extremes averaging block 222 averages the minimum and maximum value for each pixel location using a weighted average in the following manner:

$$A = \begin{cases} m, & m < t_1 \\ \dfrac{M-m}{t_2 - t_1}(m - t_1) + m, & t_1 \le m \le t_2 \\ M, & t_2 < m \end{cases} \quad (5)$$

In Equation 5, m is the minimum code value, M is the maximum code value, $t_1$ and $t_2$ are threshold values, and A is the weighted average. For an 8-bit code values range (0-255), appropriate threshold values are $t_1$=64 and $t_2$=192. The weighted average, A, becomes the all-in-focus image 204 code value for the given pixel location.

Figure 5:
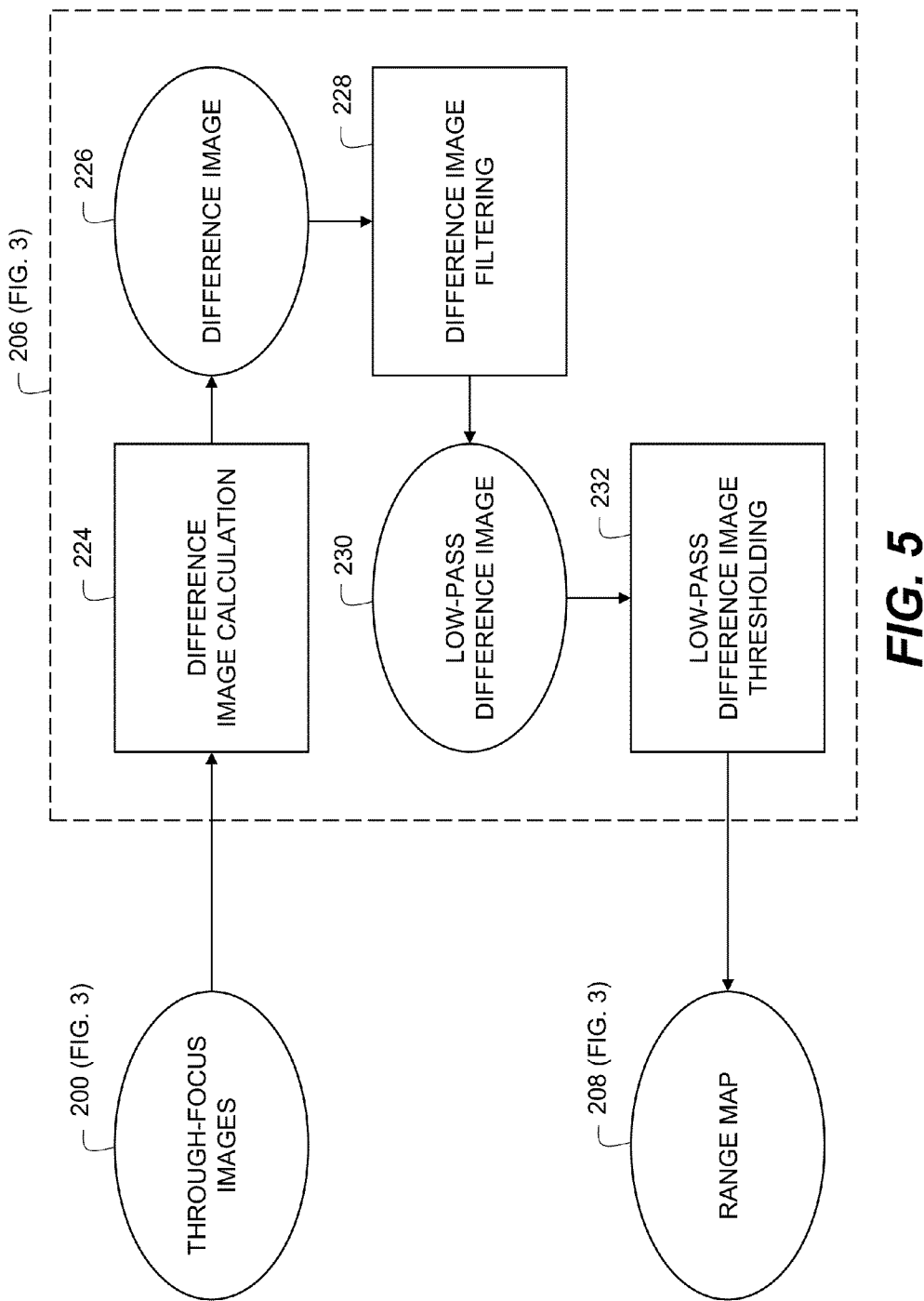
FIG. 5 is a block diagram showing a detailed view of the range map generation block for a preferred embodiment of the present invention.

FIG. 5 is a detailed description of the range map generation block 206 (FIG. 3) for the preferred embodiment. A difference image 226 is calculated by a difference image calculation block 224 from the through-focus images 200 (FIG. 3). A low-pass difference image 230 is generated by a difference image filtering block 228 from the difference image 226. The range map 208 (FIG. 3) is produced by a low-pass difference image threshold block 232 from the low-pass difference image 230.

In FIG. 5 the difference image calculation block 224 computes the normalized difference between two through-focus images 200 (FIG. 3) in the following manner:

$$d = \frac{f_1 - f_2}{f_1 + f_2} \quad (6)$$

In Equation 6 $f_1$ and $f_2$ are the code values for a given pixel location from two through-focus images 200 (FIG. 3) and d is the resulting difference image code value for the given pixel location. The difference image filtering block 228 filters the difference image 226 with a standard low-pass filter. In the preferred embodiment this filter takes the following form:

$$\frac{1}{4096}\begin{pmatrix} 1 & 6 & 15 & 20 & 15 & 6 & 1 \\ 6 & 36 & 90 & 120 & 90 & 36 & 6 \\ 15 & 90 & 225 & 300 & 225 & 90 & 15 \\ 20 & 120 & 300 & 400 & 300 & 120 & 20 \\ 15 & 90 & 225 & 300 & 225 & 90 & 15 \\ 6 & 36 & 90 & 120 & 90 & 36 & 6 \\ 1 & 6 & 15 & 20 & 15 & 6 & 1 \end{pmatrix} \quad (7)$$

The low-pass difference image threshold block 232 thresholds the low-pass difference image 230 into three regions using a 2% histogram penetration at both ends of the code value range. The pixel code values in the lowest 2% of the code value distribution in the low-pass difference image 230 are assigned to the "close" category in the range map 208 (FIG. 3). The pixel code values in the highest 2% of the code value distribution in the low-pass difference image 230 are assigned to the "far" category in the range map 208 (FIG. 3). The remaining pixel code values of the code value distribution in the low-pass difference image 230 are assigned to the "null", or no information category. As a result, the range map 208 (FIG. 3) contains one of three values at any given pixel location.

Figure 6:
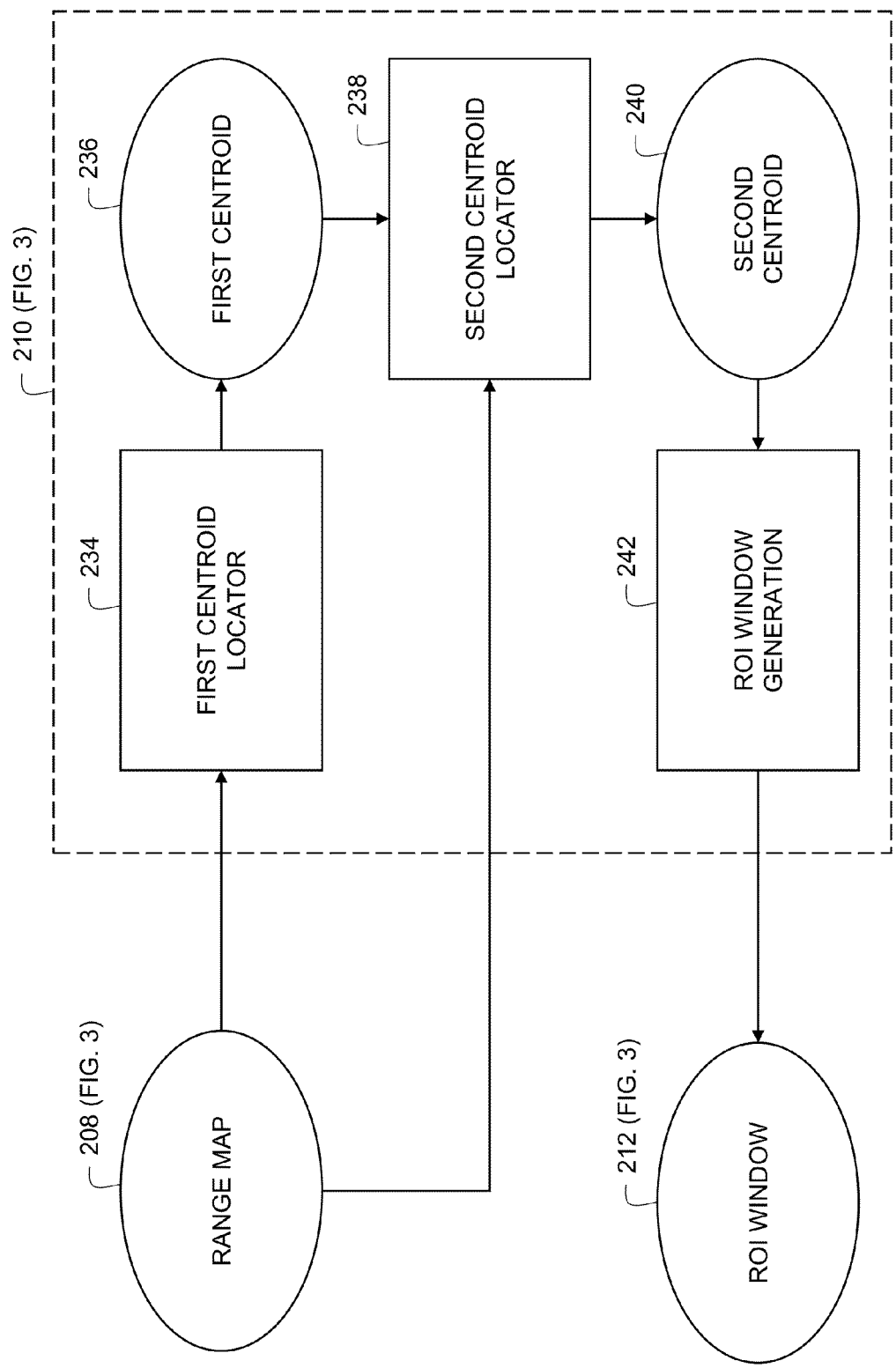
FIG. 6 is a block diagram showing a detailed view of the ROI window locator block for a preferred embodiment of the present invention.

FIG. 6 is a detailed description of the ROI window locator block 210 (FIG. 3) for the preferred embodiment. A first centroid 236 is located by a first centroid locator block 234 from the range map 208 (FIG. 3). A second centroid 240 is located by a second centroid locator block 238 from the first centroid 236 and the range map 208 (FIG. 3). The ROI window 212 (FIG. 3) is generated by a ROI window generation block 242 from the second centroid 240.

In FIG. 6 the first centroid locator block 234 locates the center of mass (centroid) of either the "close" of "far" pixel values in the range map 208 (FIG. 3). If it is desired to identify objects that are close, this is done by computing the average x and y pixel coordinates for the "close" pixel values in the range map 208 (FIG. 3). If it is desired to identify objects that are far, this is done by computing the average x and y pixel coordinates for the "far" pixel values in the range map 208 (FIG. 3). These average x and y pixel coordinates become the first centroid 236. The second centroid locator block 238 performs an exhaustive search of the region around the first centroid 236 to find an improved centroid location. For the purposes of this search, the range map 208 (FIG. 3) values "close", "null", and "far" are assigned the numeric values of −1, 0, and 1. For each location in the search region the following merit function value is computed:

$$S_{p,q} = \sum_{m=-W_x+p}^{W_x+p} \sum_{n=-W_y+q}^{W_y+q} r_{m,n}(W_x - |m - c_x|)(W_y - |n - c_y|) \quad (8)$$

In Equation 8 $r_{m,n}$ is the range map 208 (FIG. 3) value at pixel location (m,n), $W_x$ and $W_y$, are one-half the width and the height of the merit function window, $(c_x,c_y)$ are the coordinates of the first centroid 236, and $S_{p,q}$ is the merit function value for the pixel location (p,q). In the exhaustive search p and q are varied between the ranges of $c_x \pm W_p$ and $c_y \pm W_q$, where $W_p$ and $W_q$ are one-half the width and the height of the exhaustive search window. The coordinates (p,q) that minimize the merit function value $S_{p,q}$ if close objects are desired become the second centroid 240. The coordinates (p,q) that maximize the merit function value $S_{p,q}$ if far objects are desired become the second centroid 240. The ROI window generation block 242 constructs a window centered on the second centroid 240. The size and shape of the window can be predefined or selected by the user. In the preferred embodiment the ROI window 212 (FIG. 3) is predefined as one-quarter the size of the all-in-focus image 204 (FIG. 3) and of the same shape. In an alternate embodiment, the ROI window 212 (FIG. 3) window shape is polygonal (either a regular polygon or a more general polygonal shape) or elliptical with any given degree of eccentricity. In another alternate embodiment the ROI window 212 (FIG. 3) is refined by appending pixels along the borders of the ROI window 212 (FIG. 3) that correspond to "close" or "far" pixels, depending on the desired range of interest. This refinement can be performed iteratively until there are no longer any changes to the size and shape of the ROI window 212 (FIG. 3).

Figure 7:
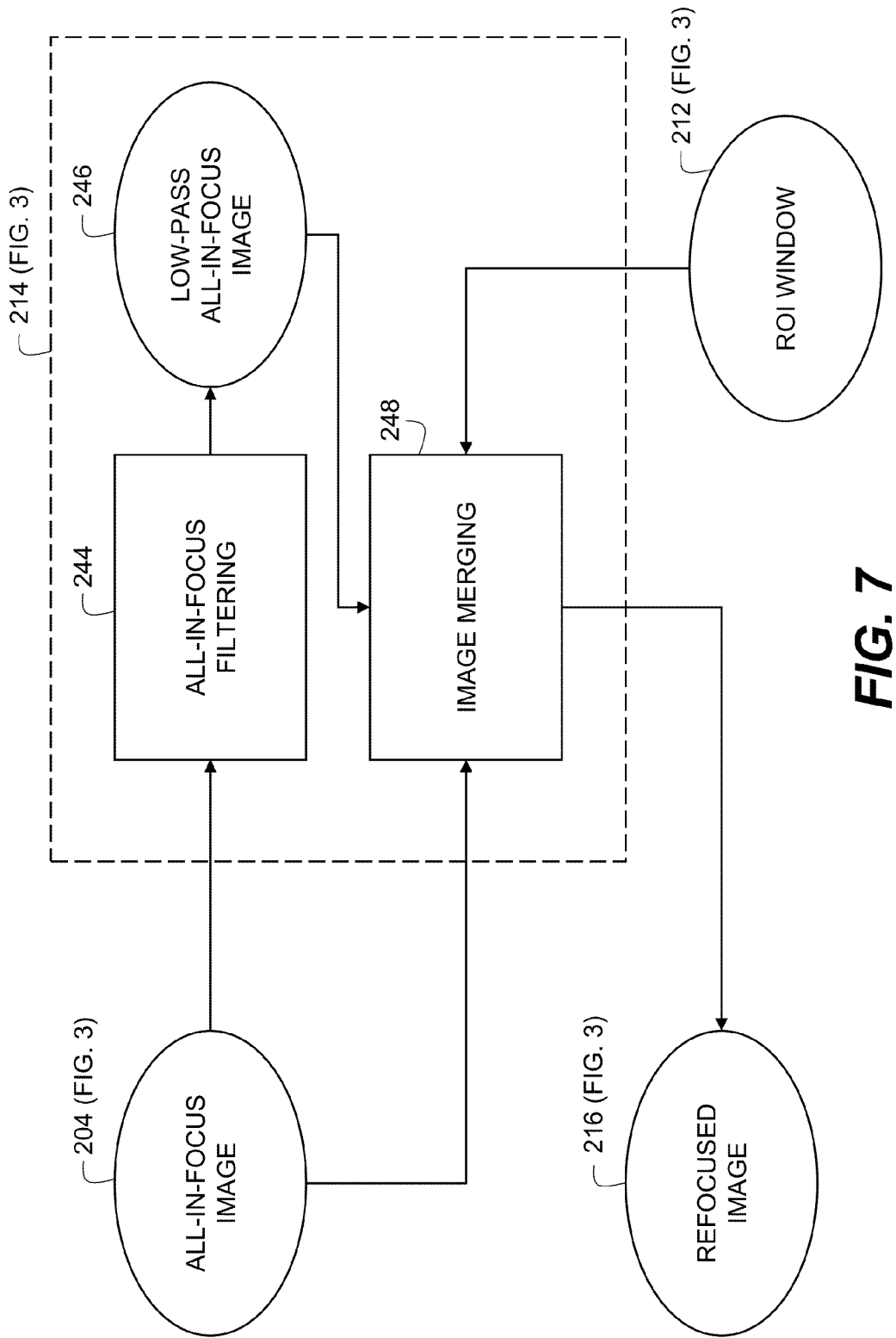
FIG. 7 is a block diagram showing a detailed view of the refocusing block for a preferred embodiment of the present invention.

FIG. 7 is a detailed description of the refocusing block 214 (FIG. 3) for the preferred embodiment. A low-pass all-in-focus image 246 is generated by an all-in-focus filtering block 244 from the all-in-focus image 204 (FIG. 3). A refocused image 216 (FIG. 3) is produced by an image merging block 248 from the all-in-focus image 204 (FIG. 3), the low-pass all-in-focus image 246, and ROI window 212 (FIG. 3).

In FIG. 7 the all-in-focus filtering block 244 performs a low-pass filtering of the all-in-focus image 204 (FIG. 3). In the preferred embodiment the low-pass filtering performed by the all-in-focus filtering block 244 uses a blur kernel with a radius of 50 pixels leading to a 101×101 kernel. The kernel coefficients are computed with the following expression:

$$H_{p,q} = \frac{\{1024 e^{-\pi[(p/100)^2+(q/100)^2]}\}}{\sum_{i=-50}^{50} \sum_{j=-50}^{50} \{1024 e^{-\pi[(i/100)^2+(j/100)^2]}\}}, -50 \le p, q \le 50 \quad (9)$$

In Equation 9 the kernel coefficients are indexed from (−50,−50) in the upper left to (50,50) in the lower right. Braces, { }, mean to round to the nearest integer. H is the resulting low-pass kernel coefficient. In an alternate embodiment the computation of the all-in-focus filtering block 244 is replaced with an additional through-focus image 200 (FIG. 3) acquired fully out of focus. This fully out of focus image becomes the low-pass all-in-focus image 246. The image merging block 248 combines the portion of the all-in-focus image 204 (FIG. 3) within the ROI window 212 (FIG. 3) with the portion of the low-pass all-in-focus image 246 outside of the ROI window 212 (FIG. 3) to provide the refocused image 216 (FIG. 3). If the region within the ROI window 212 (FIG. 3) is assigned a numerical value of one and the region outside the ROI window 212 (FIG. 3) is assigned a numerical value of zero, the following expression describes the image merging process:

$$R_{i,j} = W_{i,j} A_{i,j} + (1 - W_{i,j}) L_{i,j} \quad (10)$$

In Equation 10 $W_{i,j}$ is the ROI window 212 (FIG. 3) numerical value, $A_{i,j}$ is the all-in-focus image 204 (FIG. 3) pixel value, $L_{i,j}$ is the low-pass all-in-focus image 246 pixel value, and $R_{i,j}$ is the refocused image 216 (FIG. 3) pixel value at pixel location (i,j). In an alternate embodiment of the present invention after the ROI window 212 (FIG. 3) has been assigned numerical values, the ROI window 212 (FIG. 3) is slightly blurred with a low-pass kernel with a small radius, such as 2 or 3 pixels. This provides a transition region from one to zero at the boundaries of the ROI window 212 (FIG. 3). In this alternate embodiment Equation 10 is still used which produces a weighted average of the all-in-focus image 204 (FIG. 3) and the low-pass all-in-focus image 246 at the ROI window 212 (FIG. 3) boundaries.

Figure 8:
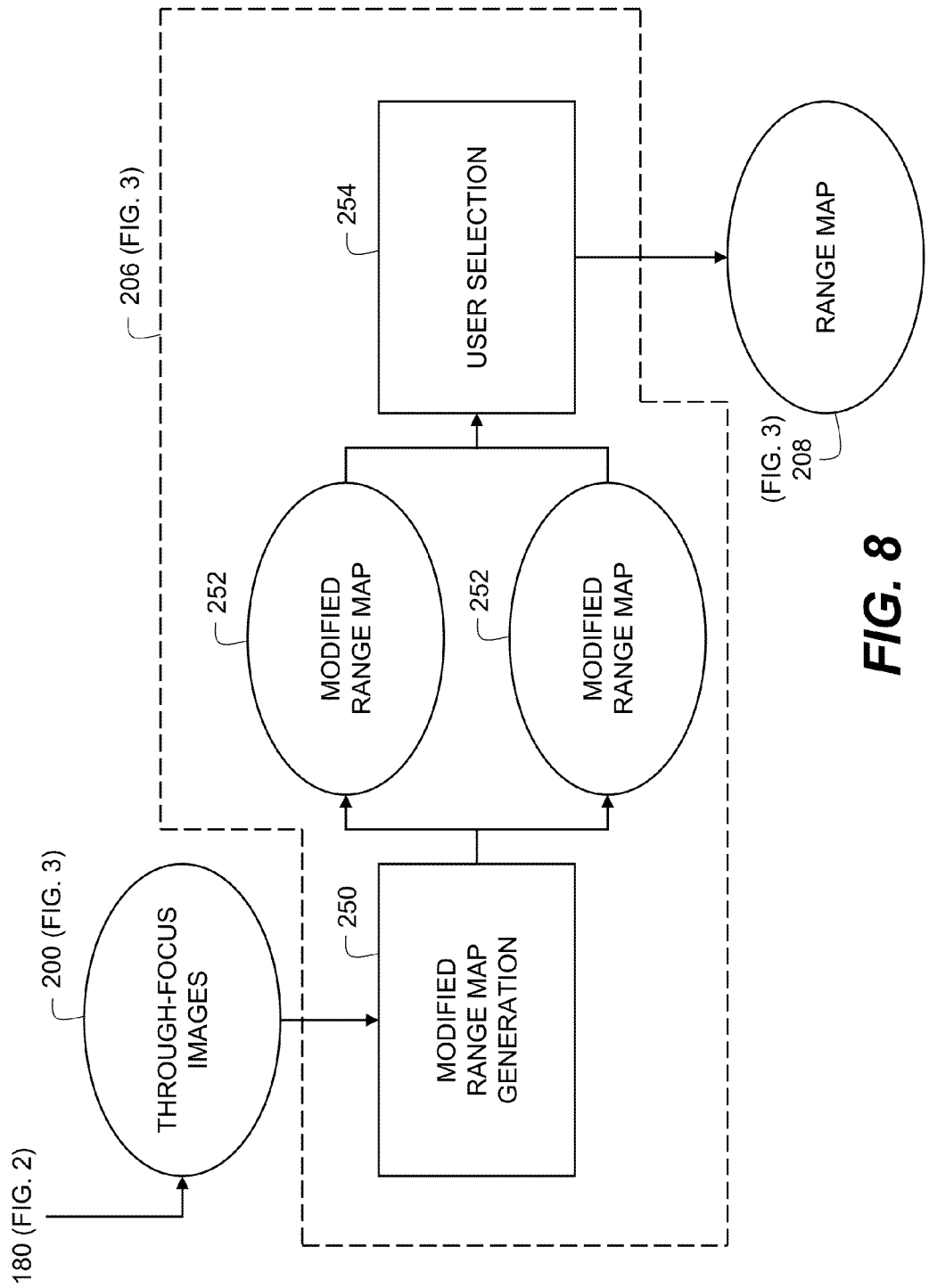
FIG. 8 is a block diagram showing a detailed view of the range map generation block for an alternate embodiment of the present invention.

FIG. 8 is an alternate embodiment of the range map generation block 206. Two or more modified range maps 252 are generated by a modified range map generation block 250 from the through-focus image 200 (FIG. 3). Each modified range map 252 contains different objects in-focus corresponding to a particular distance in the scene. One of these modified range maps 252 is selected by the user in a user selection block 254 and becomes the range map 208 (FIG. 3) As an example, one modified range map 252 can contain "close" objects in focus, another modified range map 252 can contain "middle" objects in focus, and another modified range map 252 can contain "far" objects in focus.

Figure 9:
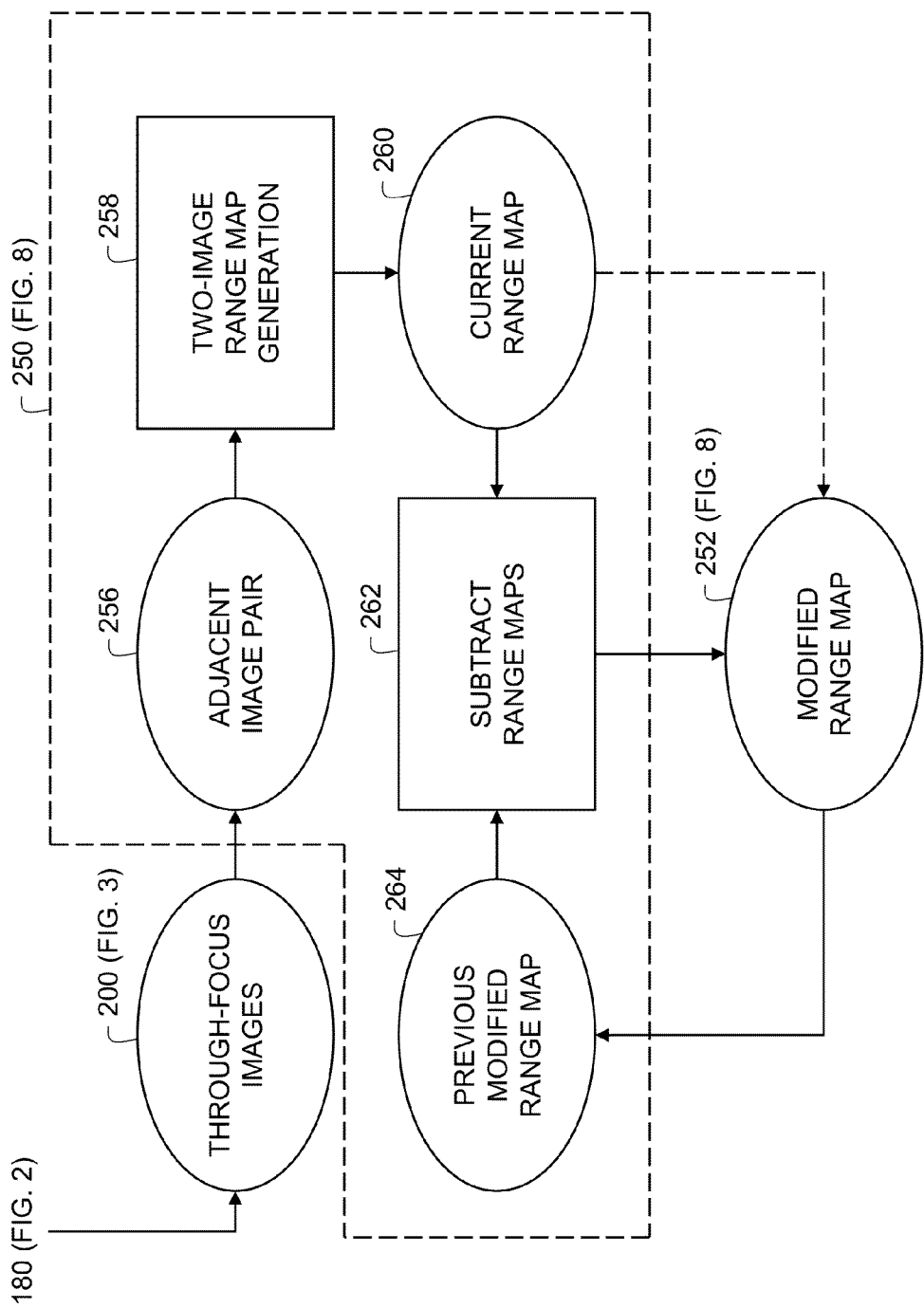
FIG. 9 is a block diagram showing a detailed view of the modified range map generation block for an alternate embodiment of the present invention.

FIG. 9 is a detailed description of the modified range map generation block 250 (FIG. 8). A current range map 260 is generated by a two-image range map generation block 258 from an adjacent image pair 256 from the through-focus images 200 (FIG. 3). The adjacent image pair 256 assumes the through-focus images 200 (FIG. 3) are ordered from one extreme lens 4 (FIG. 1) focus position to the other. The two-image range map generation block 258 performs the same operations as previously described in the range map generation block 206 (FIG. 3). When using the first adjacent image pair 256 from the through-focus images 200 (FIG. 3), the current range map 260 simply becomes the first modified range map 252 (FIG. 8). When the second adjacent image pair 256 is used to generate a second current range map 260, the second modified range map 252 (FIG. 8) is produced by a subtract range maps block 262 from a previous modified range map 264. The subtract range maps block 262 changes "close" pixel values in the current range map 260 that are also "close" pixel values in the previous modified range map 264 into "null" pixel values in the modified range map 252 (FIG. 8). All other pixel values in the current range map 260 are passed unchanged to the modified range map 252 (FIG. 8). In this way "close" pixel values in the modified range map 252 (FIG. 8) represent the closest object in the scene not already identified as being even closer in the previous modified range maps 252 (FIG. 8). The modified range map generation block 250 (FIG. 8) can be executed as many times as there are through-focus images 200 (FIG. 3) minus one to produce as many modified range maps 252 (FIG. 8).

A computer program product can include one or more storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

The invention has been described in detail with particular reference to certain preferred embodiments thereof, but it will be understood that variations and modifications can be effected within the spirit and scope of the invention.

PARTS LIST

| | |
|---|---|
| 2 | flash |
| 4 | lens |
| 6 | adjustable aperture and adjustable shutter |
| 8 | zoom and focus motor drives |
| 10 | digital camera |
| 12 | timing generator |
| 14 | image sensor |
| 16 | ASP and A/D Converter |
| 18 | buffer memory |
| 20 | processor |
| 22 | audio codec |
| 24 | microphone |
| 25 | pressure sensor |
| 26 | speaker |
| 28 | firmware memory |
| 30 | image memory |
| 32 | image display |
| 34 | user controls |
| 36 | display memory |
| 38 | wired interface |
| 40 | computer |
| 42 | tilt sensor |
| 44 | video interface |
| 46 | video display |
| 48 | interface/recharger |
| 50 | wireless modem |
| 52 | radio frequency band |
| 58 | wireless network |
| 70 | Internet |
| 72 | photo service provider |
| 90 | white balance setting |
| 95 | white balance step |
| 100 | color sensor data |
| 105 | noise reduction step |
| 110 | ISO setting |
| 115 | demosaicking step |
| 120 | resolution mode setting |
| 125 | color correction step |
| 130 | color mode setting |
| 135 | tone scale correction step |
| 140 | contrast setting |
| 145 | image sharpening step |
| 150 | sharpening setting |
| 155 | image compression step |
| 160 | compression mode setting |
| 165 | file formatting step |
| 170 | metadata |
| 175 | photography mode settings |
| 180 | digital image file |
| 185 | camera settings |
| 200 | through-focus images |
| 202 | all-in-focus image generation block |
| 204 | all-in-focus image |
| 206 | range map generation block |
| 208 | range map |
| 210 | ROI window locator block |
| 212 | ROI window |
| 214 | refocusing block |
| 216 | refocused image |
| 218 | through-focus extremes identification block |
| 220 | through-focus extremes |
| 222 | through-focus extremes averaging block |
| 224 | difference image calculation block |
| 226 | difference image |
| 228 | difference image filtering block |
| 230 | low-pass difference image |
| 232 | low-pass difference image thresholding block |
| 234 | first centroid locator block |
| 236 | first centroid |
| 238 | second centroid locator block |
| 240 | second centroid |
| 242 | ROI window generation |
| 244 | all-in-focus filtering block |
| 246 | low-pass all-in-focus image |
| 248 | image merging block |
| 250 | modified range map generation block |
| 252 | modified range map |
| 254 | user selection block |
| 256 | adjacent image pair |
| 258 | two-image range map generation block |
| 260 | current range map |
| 262 | subtract range maps block |
| 264 | previous modified range map |

The invention claimed is:

1. A method of providing a refocused image, comprising using a processor to perform the steps of
   (a) acquiring at least two captured images of a scene with differing focus settings;
   (b) using the at least two captured images to provide an all-in-focus image;
   (c) generating a range map from the at least two captured images;
   (d) locating a region-of-interest (ROI) window from the range map including locating a first centroid of a region-of-interest (ROI) from the range map, refining the first centroid to locate a second centroid of a region of interest (ROI), and locating the region-of-interest (ROI) window from the second centroid and a predefined window shape and size; and (e) providing a refocused image from the all-in-focus image and the region-of-interest (ROI) window.

2. The method of claim 1 wherein step (b) further includes identifying extreme pixels values from the captured images and producing the all-in-focus image from the extreme pixels values.

3. The method of claim 1 wherein step (c) further includes calculating at least one difference image from the captured images and thresholding the difference images to generate the range map.

4. The method of claim 1 wherein step (a) further includes acquiring a fully out of focus image of the scene.

5. The method of claim 4 wherein step (e) further includes producing the refocused image from the all-in-focus image, the fully out of focus image, and the region-of-interest (ROI) window.

6. The method of claim 2 wherein the extreme pixel values are minimum and maximum pixel values.

7. The method of claim 2 further including averaging the extreme pixel values to produce the all-in-focus image.

8. The method of claim 3 further including generating at least two modified range maps indicating at least two different scene distances.

9. The method of claim 8 further including generating the range map from one of the modified range maps.

10. The method of claim 1 further including a predefined polygonal or elliptical window shape.

11. The method of claim 1 further including a window size equal to one-quarter the size of the all-in-focus image.

12. The method of claim 1 further including refining the region-of-interest (ROI) window shape and size.

13. A method of providing a refocused image, comprising using a processor to perform the steps of
(a) acquiring at least two captured images of a scene with differing focus settings;
(b) using the at least two captured images to provide an all-in-focus image;
(c) generating a range map from the at least two captured images;
(d) locating a region-of-interest (ROI) window from the range map; and
(e) providing a refocused image from the all-in-focus image and the region-of-interest (ROI) window including providing a low-pass all-in-focus image from the all-in-focus image and producing the refocused image from the all-in-focus image, low-pass all-in-focus image, and the region-of-interest (ROI) window.

14. A method of providing a refocused image, comprising using a processor to perform the steps of
(a) acquiring at least two captured images of a scene with differing focus settings at least one of which is a fully out of focus image of the scene;
(b) using the at least two captured images to provide an all-in-focus image;
(c) generating a range map from the at least two captured images;
(d) locating a region-of-interest (ROI) window from the range map; and
(e) providing a refocused image from the all-in-focus image, the region-of-interest (ROI) window, and at least one fully out of focus image.

* * * * *